United States Patent [19]

Takahama et al.

[11] Patent Number: 5,253,061
[45] Date of Patent: Oct. 12, 1993

[54] METHOD AND APPARATUS FOR CONTROLLING TELEVISION IMAGE PROCESSING BASED UPON TELEVISION PROGRAM DETECTION

[75] Inventors: Kengo Takahama, Nara; Yasukuni Yamane, Shiki, both of Japan

[73] Assignee: Sharp Kabushiki Kaisha, Japan

[21] Appl. No.: 697,334

[22] Filed: May 9, 1991

[30] Foreign Application Priority Data

May 16, 1990 [JP] Japan ................... 2-125914

[51] Int. Cl.$^5$ .......................... H04N 5/14; H04N 9/79
[52] U.S. Cl. .................................. 358/160; 358/310; 360/69; 360/33.1
[58] Field of Search ................. 358/160, 84, 335, 310, 358/86; 360/5, 6, 69, 71, 33.1; 382/42; 369/19

[56] References Cited

U.S. PATENT DOCUMENTS

| | | | |
|---|---|---|---|
| 4,677,466 | 6/1987 | Lert, Jr. et al. | 358/84 |
| 4,879,611 | 11/1989 | Fukui et al. | 360/69 |
| 4,991,025 | 2/1991 | Eigeldinger | 358/310 |

FOREIGN PATENT DOCUMENTS

| | | |
|---|---|---|
| 61-201581 | 9/1986 | Japan . |
| 2-5689 | 1/1990 | Japan . |
| 2040129 | 8/1980 | United Kingdom ............... 358/146 |

OTHER PUBLICATIONS

Patent Abstracts of Japan-corresponding to reference 1 and 2.

*Primary Examiner*—James J. Groody
*Assistant Examiner*—Safet Metjahic
*Attorney, Agent, or Firm*—Nixon & Vanderhye

[57] ABSTRACT

A television image processing apparatus has a memory for storing television signals with respect to a predetermined frame image. The apparatus also has an arithmetic correlation circuit for calculating correlation quantity between television signals of each frame image applied thereto in real time and television signals of the frame image stored in the memory, and a control circuit for generating a control signal when the correlation quantity calculated by the arithmetic correlation circuit exceeds a predetermined value.

13 Claims, 5 Drawing Sheets

METHOD AND APPARATUS FOR CONTROLLING TELEVISION IMAGE PROCESSING BASED UPON TELEVISION PROGRAM DETECTION

BACKGROUND OF THE INVENTION

1. Field of the Invention

The present invention relates to a television image processing apparatus used in a television image editor and a television receiver equipped with a searching function.

2. Description of the Related Art

Various kinds of technologies to automatically control the time or stop time of a recording operation have been proposed for a television image editor such as a video tape recorder (VTR) or for a television receiver.

A method most generally employed is to utilize a timer which functions as a clock. In this method, the time to start recording or receiving a television program is manually preset in the timer, the timer being installed in the television receiver. Then, the real time and the time preset in the timer are continuously compared with each other. When both times coincide, the recording or receiving operation is started. According to this function, it is possible to edit or receive desired images at a specified time.

However, in a conventional apparatus equipped with such a timer, if a standard time is not correctly adjusted, unnecessary images may be recorded or played at the beginning or the end of the editing or receiving. In addition, a necessary image may not be recorded or played. Such a situation is also caused by a careless mistake of miss-setting the timer start time, or by a timer error caused by a frequency change of a crystal oscillator with the passage of time.

Another problem is that a program such as the relay of a base-ball game is sometimes extended. If such an irregular program is positioned before the desired program to be received, the timer (although correctly adjusted) can not always be effective to edit or receive the desired program.

SUMMARY OF THE INVENTION

It is therefore an object of the present invention to provide a television image processing apparatus capable of controlling exactly the starting and/or stopping of the instrument connected thereto when a desired television frame image is supplied.

The aforementioned object is achieved by a television image processing apparatus equipped with a memory for storing television signals with respect to a predetermined frame image, an arithmetic correlation circuit for calculating correlation quantity between television signals of each frame image applied thereto in real time and television signals of the frame image stored in the memory, and a control circuit for generating a control signal when the correlation quantity calculated by the arithmetic correlation circuit exceeds a predetermined value.

When correlation quantity between a frame image stored in the memory and that applied thereto in real time exceeds a predetermined value, a detect signal is outputted to an object instrument so as to control the start and/or stop thereof.

Thus, exact control of start and/or stop of the connected instrument is possible without using a timer, even if a program received after an irregular program such as a baseball game program, which was conventionally impossible to control exactly.

Further objects and advantages of the present invention will be apparent from the following description of the preferred embodiments of the invention as illustrated in the accompanying drawings.

DESCRIPTION OF THE PREFERRED EMBODIMENTS

Referring to the accompanying drawings, preferred embodiments of the invention will now be described.

A plurality of title images of respective television programs are previously stored in a representation points memory as a reference image. After one title image corresponding to a desired program is selected by an operator, the apparatus stands by for recording. When a title image applied thereto in real time has high degree similarity to the selected title image, an image editor starts the recording operation.

Figure 1:
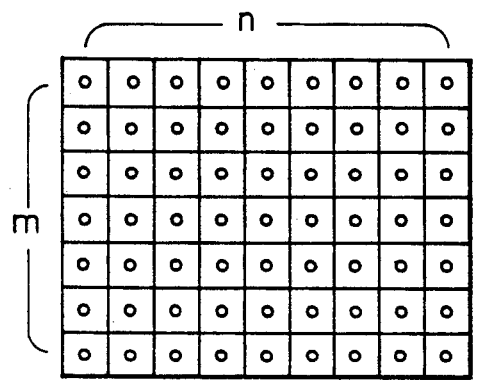
FIG. 1 shows relationship between divided areas of a screen and representation points.

As shown in FIG. 1, a screen for images is vertically divided into m equal parts and horizontally in n equal parts, or m×n small areas. A representation point (illustrated in FIG. 1 by an circle) is assigned to each divided area. A group of representation points composed of m×n number of areas is regarded as a frame image or a field image. Based on the absolute value of the difference between television signals of a selected or stored frame image and television signals applied thereto in real time, or based on the accumulated quantity of the square of the aforementioned absolute value of difference, a timing signal is generated. This timing signal is used as a trigger for an image editor so that exact control of the starting and/or stopping of recording and editing are carried out.

Figure 2:
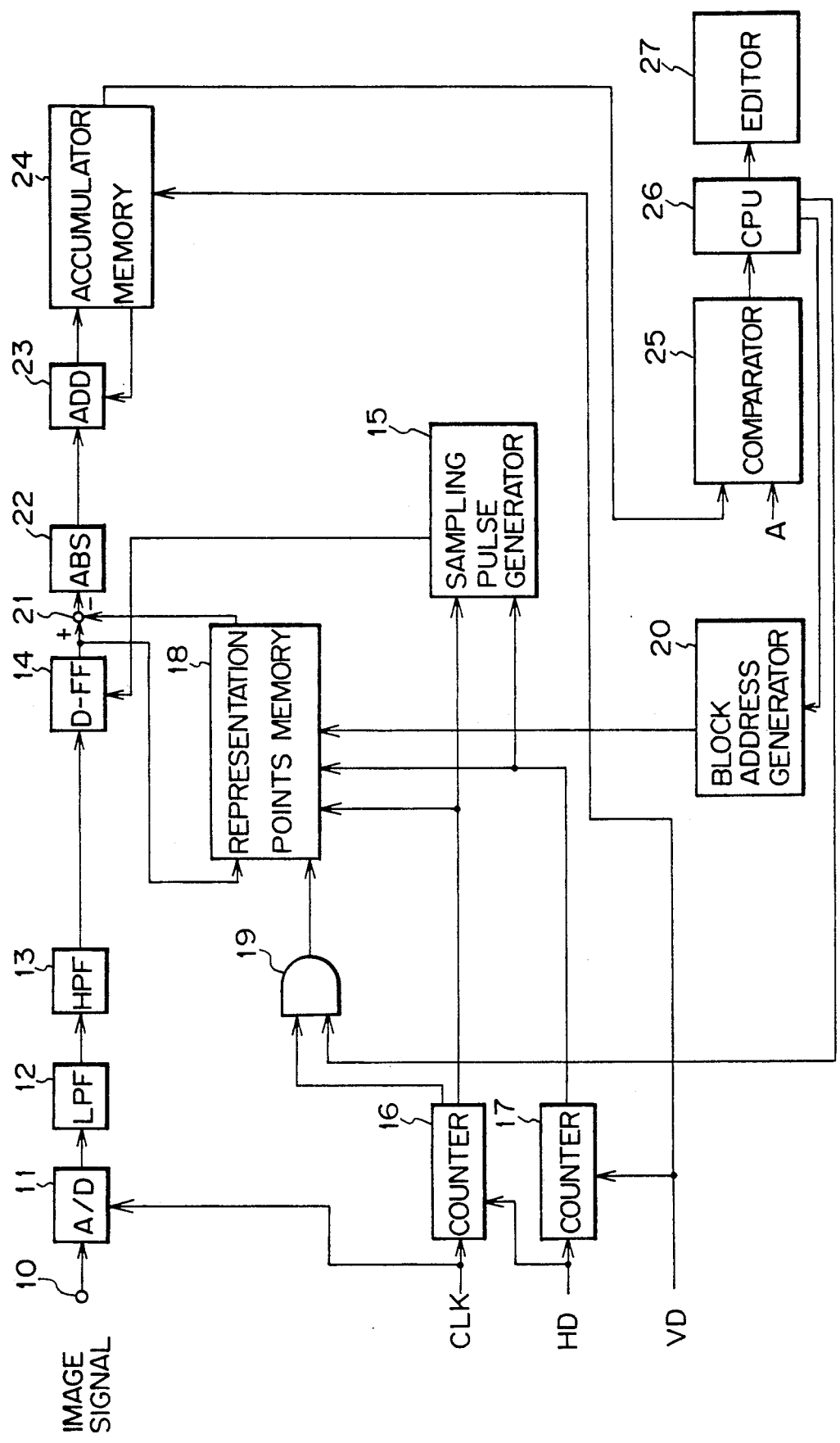
FIG. 2 schematically shows an electrical circuit in a preferred embodiment according to the present invention.

FIG. 2 shows a block diagram of an electrical circuit in a preferred embodiment according to the present invention. In FIG. 2, reference numeral 10 denotes an input terminal for sequentially receiving analog television image signals. The input terminal 10 is coupled to an input terminal of D flip-flop 14 via an A/D converter 11 (for converting the analog television image signals to digital television image signals), a low pass filter 12 (for suppressing noise), and a high pass filter 13 (for suppressing influence of the change in luminance in the total image area). The D flip-flop 14 latches data corresponding to the filtered television image signals.

A sampling pulse generator 15, which generates pulses for sampling the representation points from the filtered image signals, is connected to a clock input terminal of D flip-flop 14. Both a counter 16 (for counting clock pulses CLK to generate horizontal addresses "0" to "(n−1))" and a counter 17 (for counting horizontal synchronous signals HD to generate vertical addresses "0" to "(m−1))" are connected to the sampling pulse generator 15.

The counters 16 and 17 are also connected to address input terminals of a representation points memory 18. The memory 18 stores image signals of a plurality of frame images to be selected. An output terminal of the counter 16 is coupled, through an AND gate 19, to a write enable signal input terminal of the representation points memory 18. An output terminal of a block address generator 20, which generates an offset address corresponding to the selected frame image, is connected to an address input terminal of the representation points memory 18.

An output terminal of the flip-flop 14 is connected to both an input terminal of the representation points memory 18 and one input terminal of a subtracter 21. Another input terminal of the subtracter 21 is connected to an output terminal of the sampling pulse generator 15. The subtracter 21 is an arithmetic circuit for calculating the difference between new input image signals and image signals of the selected frame image stored in the representation points memory 18. An output terminal of the subtracter 21 is connected to an absolute value circuit 22.

An output terminal of the absolute value circuit 22 is connected to an adder 23, whose output terminal is connected to an accumulator memory 24. Thus, at the adder 23, the output value of the absolute value circuit 22 and a value of data stored in the accumulator memory 24 are added. An output terminal of the accumulator memory 24 is connected to an input terminal of a comparator 25. A predetermined threshold value A is applied to the other input terminal of the comparator 25. An output terminal of the comparator 25 is connected to a CPU (Central Processing Unit) 26. This CPU/26 is connected to both an editor 27 and the AND gate 19.

Figure 3:
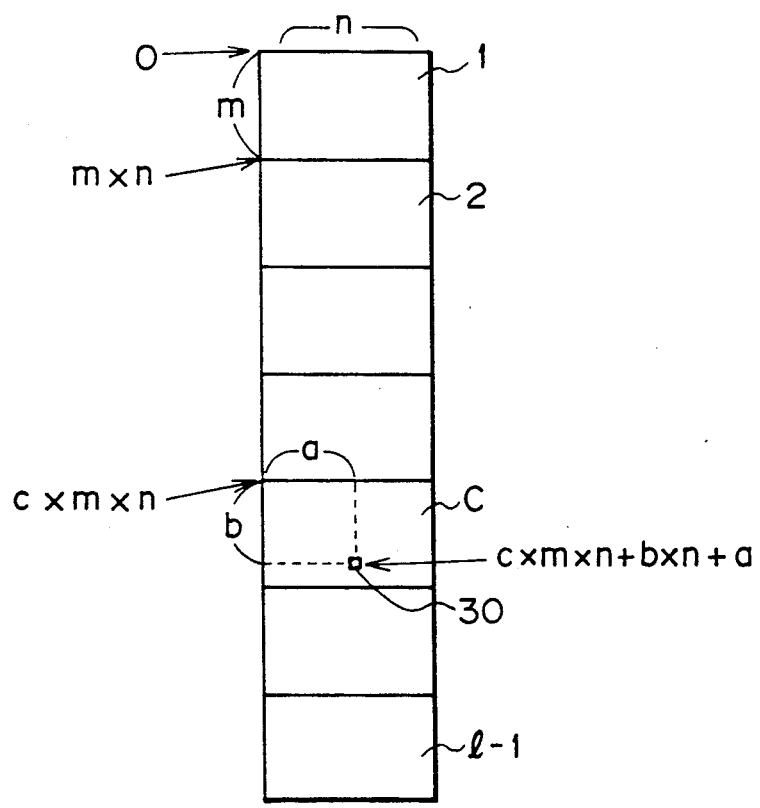
FIG. 3 shows an address arrangement of representation points memory in the embodiment of FIG. 2.

FIG. 3 denotes the concept of memory blocks of the representation points memory 18. In the figure, 1, 2, . . ., c, . . . , (1−1) correspond to respective blocks and O, (m×n), . . . , (c×m×n) correspond to offset addresses. At a point shown in the figure by a reference numeral 30, the offset address is (c×m×n) whereas the real address is (c×m×n)+(b×n)+a. The capacity of the representation points memory 18 is (l×m×n×p) bits if a quantization level of a luminance signal is assumed as p bits.

The operation of the above-mentioned embodiment is now described.

Inputted television image signals are temporality stored in the memory 18 in order to form a reference image as follows.

The AND gate 19 is at first turned on by a control signal from the CPU 26 so that a write enable signal is applied to the representation points memory 18. Absolute addresses of the memory 18 are supplied from the counters 16 and 17 and from the block address generator 20. Thus, luminance values at the respective representation points, which values are obtained by latching each of the television image signals of one frame image at the flip-flop 14, are stored in the representation points memory 18. The block where a reference image is to be stored is assigned by the CPU 26. A plurality of blocks are arranged as shown in FIG. 3, and one reference image is stored in one of these blocks.

Correlation between the reference image stored in the representation points memory 18 and a frame image formed by inputted television image signals is calculated, and a timing for starting and/or stopping operation of the image editor is as follows.

The gate 19 is turned off by the control signals from the CPU 26, and thus the representation points memory 18 is ready to be read out. The reference image data stored in the block at the address assigned by a block address generator 20 are sequentially read out from the representation points memory 18 by a command from the CPU 26. The data read out are sequentially applied to the subtracter 21. Television image signals newly inputted are sampled by the flip-flop 14 in response to sampling pulses from the sampling pulse generator 15 to obtain luminance values of the respective representation points. The sampled values are sequentially applied to the subtracter 21. As a result, the subtractor 21 outputs the signals corresponding to difference between both of the data of the respective representation points to the absolute value circuit 22. The absolute value circuit 22 outputs absolute value of the inputted value to the adder 23. The adder 23 adds the value from the absolute value circuit 22 to the value read out from the accumulator memory 24. The calculated results from the adder 23 is stored again in the accumulator memory 24. Thus, the accumulated value represents a correlation between the inputted image and the reference image. The smaller the accumulated value, the higher the correlation.

The accumulated value is then compared with a threshold value A at the comparator 25. If the accumulated value is lower than A, a detection signal is outputted to the CPU 26. The detection signal is finally utilized by the CPU 26 as a signal to control start and/or stop operation of the image editor 27 such as a VTR. Therefore, when an image with high similarity to the reference image stored in the representation points memory 18 is inputted, the image editor 27 is driven to start or stop the recording or editing operation.

As a result, even if an irregular program like the relay of a baseball game is positioned before the desired television program, the program can be automatically recorded without fail.

Figure 4:
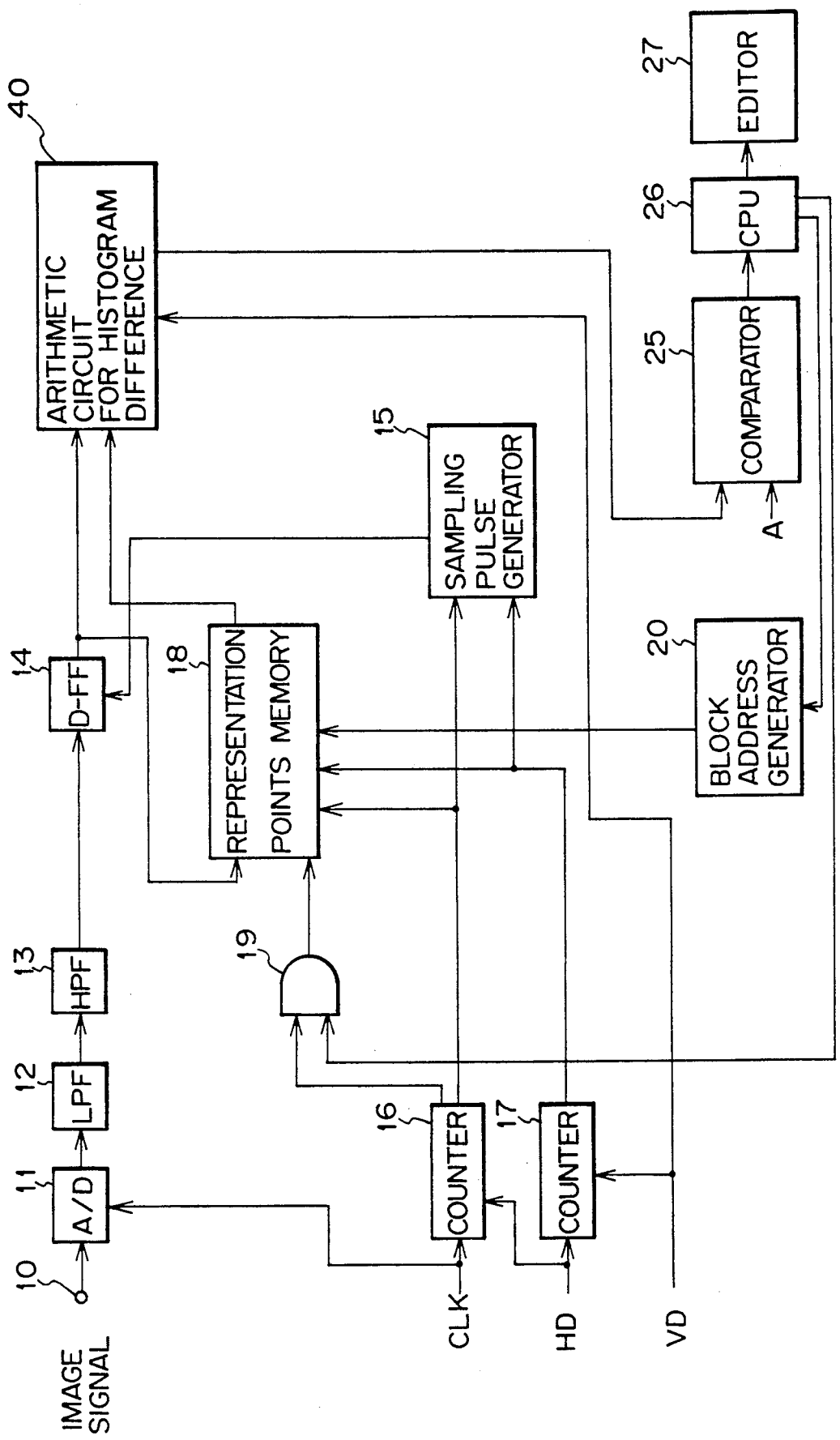
FIG. 4 schematically shows an electrical circuit in an another embodiment according to the present invention.

FIG. 4 shows a block diagram of an electrical circuit of another embodiment according to the present invention.

Figure 5:
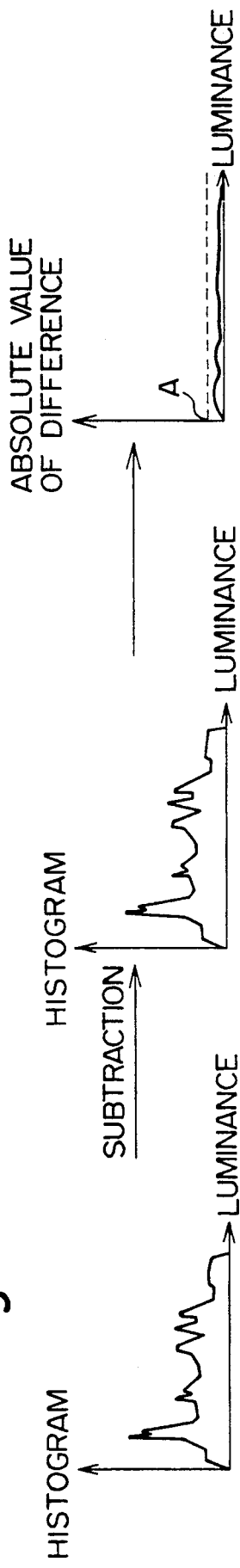
FIG. 5 shows the correlation between stored data and input data in the embodiment of FIG. 4.

In the embodiment of FIG. 2, a multi-value correlation arithmetic circuit is utilized for judging similarity between two frames or between two fields. In this embodiment, an arithmetic circuit 40 for calculating the difference of histogram with respect to luminance between a reference image and a newly inputted television image is provided. In the arithmetic circuit 40, luminance histograms of both images are first calculated as shown in FIG. 5, and then absolute difference between the two histograms are calculated. The other constructions and the operations in this embodiment are the same as those in FIG. 2.

Figure 7:
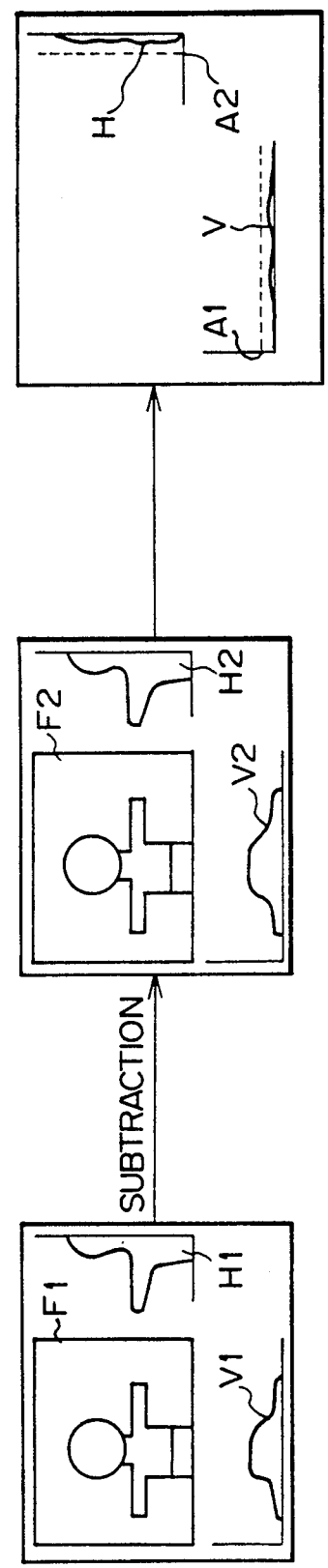
FIG. 7 shows the correlation between stored data and input data in the embodiment of FIG. 6.
Figure 6:
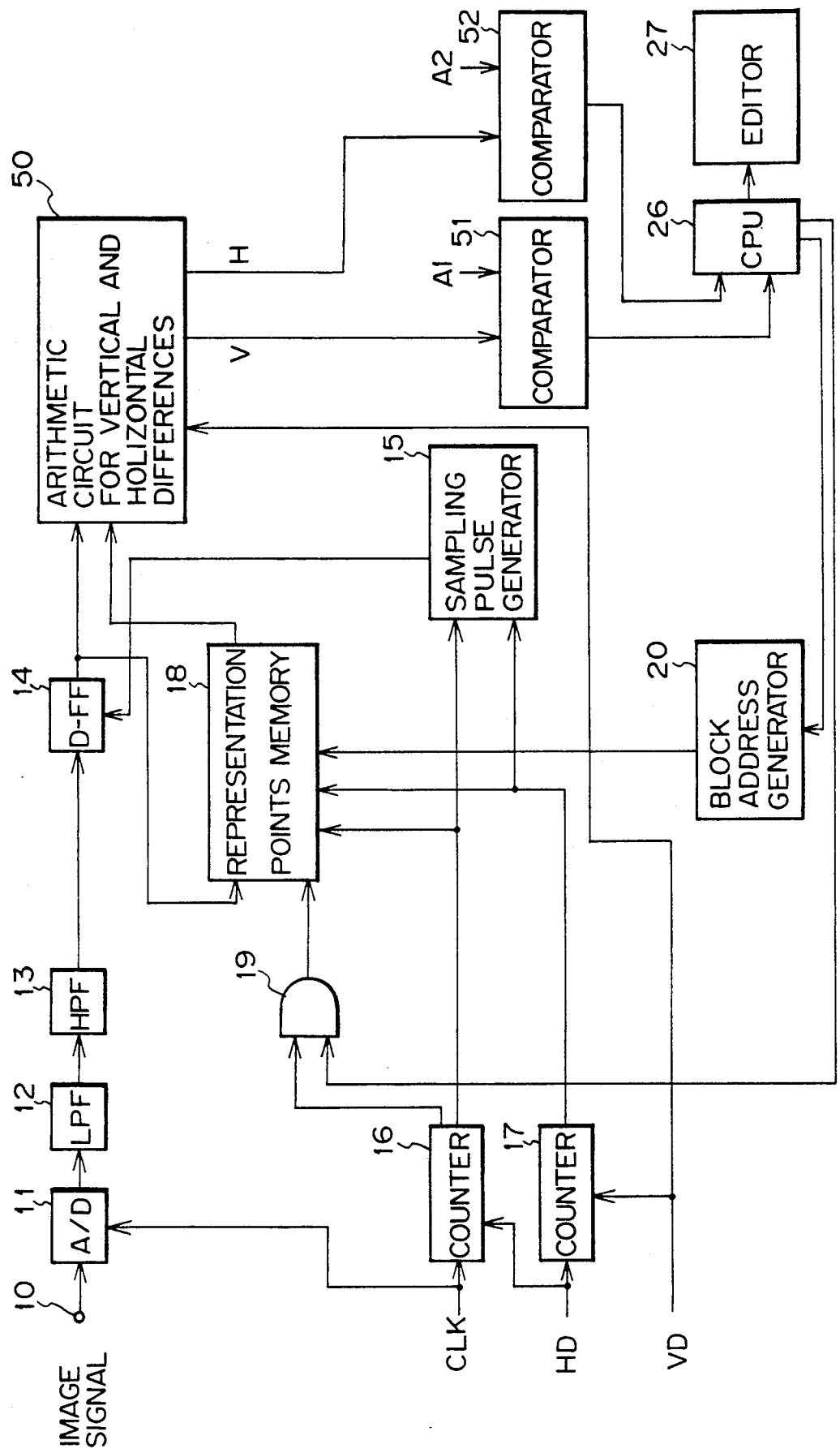
FIG. 6 schematically shows an electrical circuit in a still another embodiment according to the present invention.

FIG. 6 shows a block diagram of an electrical circuit of still another embodiment. In the embodiment, arithmetic circuit 50 is equipped to calculate the difference in vertical and horizontal projections of luminance between a reference image and a newly inputted television image. As shown in FIG. 7, by an arithmetic circuit 50, the differences V and H are calculated from respective vertical projections of luminance V1 and V2 and from respective horizontal projections H1 and H2 with respect to both a reference image F1 and a newly inputted television image F2. The differences V and H are then compared in respective comparators 51 and 52, so as to judge whether they are below respective thresholds A1 and A2. The other constructions and operations are the same as those in FIG. 2.

Other circuits for correcting vertical and/or horizontal deviations between two frames or two field images may be applicable to the correlation circuit.

If the television image editor 27 is replaced by a television receiver in the embodiments of FIG. 2, 4, and 6, replaying a monitor, and turning on and/or off of the television receiver can be automatically controlled without fail.

In the embodiment described above. Luminance in television signals is utilized for judging similarity, while RGB signal or composite signal may also be applicable from a stand point of cost or size.

The invention is also applicable to an instrument to cancel an unnecessary commercial program for reserving a specified program or for switching off the television set.

Many widely different embodiments of the present invention may be constructed without departing from the spirit and scope of the present invention. It should be understood that the present invention is not limited to the specific embodiments described in the specification, except as defined in the appended claims.

What is claimed is:

1. A television frame image detecting apparatus for detecting television signals representative of a predetermined frame image, said apparatus comprising:
    a memory means storing television signals with respect to a predetermined frame image at a representation point in each of divided areas of a screen for image;
    a sampling means for sampling television signals of each frame image applied thereto in real time at said representation point in each of said divided areas of said screen;
    an arithmetic correlation means for calculating correlation quantity between sampled television signals of each frame image and television signals of the predetermined frame image stored in said memory means; and
    a control means for generating a control signal to be used for controlling at least one of recording start and recording stop in a video recorder when the correlation quantity calculated by said arithmetic correlation means exceeds a predetermined value.

2. An apparatus as claimed in claim 1, wherein said arithmetic correlation means includes means for calculating an accumulated value of the absolute difference between television signals of each frame image applied thereto in real time and television signals of the frame image stored in said memory means, said calculated accumulated value corresponding to the correlation quantity.

3. An apparatus as claimed in claim 2, wherein said calculation means includes a subtractor for producing signals representative of difference between representation points of each frame image applied thereto in real time and television signals of the frame image stored in said memory means.

4. An apparatus as claimed in claim 3, wherein said calculation means includes an absolute value circuit connected to said subtracter, for producing absolute value signals corresponding to the signals produced from said subtracter.

5. An apparatus as claimed in claim 4, wherein said calculation means includes an adder connected to said absolute value circuit and an accumulator memory connected to said adder which cooperate with each other to produce a signal representative of the correlation quantity.

6. An apparatus as claimed in claim 1, wherein said control means includes a comparator for comparing the correlation quantity calculated by said arithmetic correlation means with a predetermined value to produce a control signal when the correlation quantity is higher than the predetermined value.

7. An apparatus as claimed in claim 1, wherein said arithmetic correlation means includes means for calculating an absolute difference between a histogram of each frame image applied thereto in real time and a histogram of the frame image stored in said memory means, said calculated absolute difference corresponding to the correlation quantity.

8. An apparatus as claimed in claim 1, wherein said arithmetic correlation means includes means for calculating respective difference in vertical and horizontal projections of luminance between each frame image and these of the frame image stored in said memory means, said calculated absolute difference corresponding to the correlation quantity.

9. An apparatus as claimed in claim 1, wherein said sampling means includes sampling pulse generator means for generating sampling pulses and latching means for latching television signals in synchronous with said sampling pulses.

10. An apparatus as claimed in claim 9, wherein said latching means is a D-type flip-flop.

11. An apparatus as claimed in claim 1, further comprising means for writing said sampled television signals into said memory means.

12. An apparatus as claimed in claim 1, wherein said predetermined frame image is a title image of a regular television program.

13. An apparatus of claim 1, wherein the divided areas of the predetermined frame image are equal with respect to vertical and horizontal extent, and wherein a representation point is assigned to each divided area.

* * * * *